United States Patent [19]
Lundqvist

[11] 3,817,517
[45] June 18, 1974

[54] DEVICE FOR ESTABLISHING A SEAL BETWEEN CYLINDRICAL SURFACES

[75] Inventor: Ulf Rolfsson Lundqvist, Mjolby, Sweden

[73] Assignee: Forenade Fabriksverken, Mjolby, Sweden

[22] Filed: Mar. 15, 1973

[21] Appl. No.: 341,377

[52] U.S. Cl.................. 277/165, 277/190, 277/176
[51] Int. Cl........................... F16j 9/00, F16j 15/32
[58] Field of Search .......... 277/165, 190, 191, 177, 277/176

[56] References Cited
UNITED STATES PATENTS

| | | | |
|---|---|---|---|
| 2,876,052 | 3/1959 | Burt | 277/165 |
| 3,426,654 | 2/1969 | Laughman | 277/191 X |
| 3,521,893 | 7/1970 | Josephson | 277/176 X |
| 3,606,356 | 9/1971 | Beroset | 277/190 |

Primary Examiner—Samuel B. Rothberg
Attorney, Agent, or Firm—Laurence R. Brown

[57] ABSTRACT

A sealing ring about a cylindrical rod moving in a cylinder separates high and low pressure areas on either side of the seal. The seal rides in an annular groove in the cylinder and has a first conically shaped steel ring with a gap between its surface and the rod with its longer surface toward the rod. A second polymeric plastic mating conically shaped ring has its shorter surface in contact with the rod surface. The back surfaces of the two rings are spaced from the back of the angular groove by a rubber ring. The angular groove has a gap on the high pressure side which permits the medium under pressure to force the two conical surfaces together urging the polymeric ring into the rod on the one hand and compressing the rubber ring to urge both the steel and plastic rings toward the rod on the other hand.

5 Claims, 1 Drawing Figure

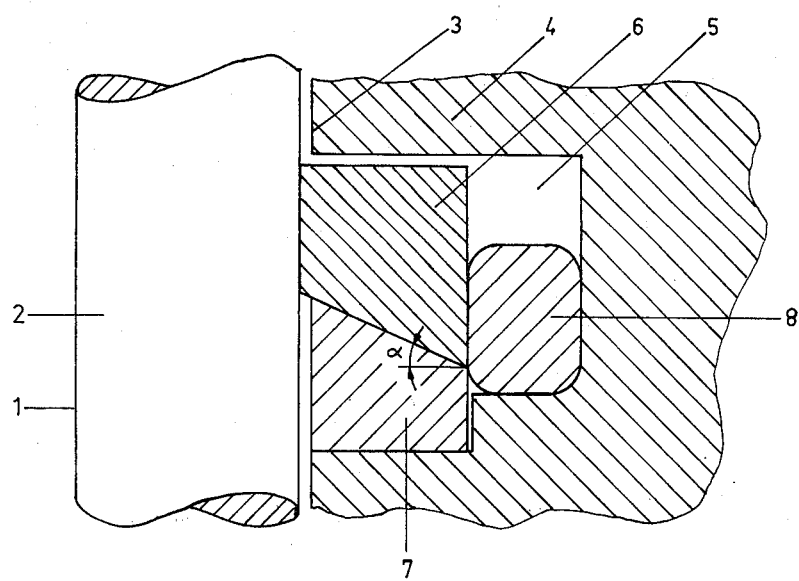

DEVICE FOR ESTABLISHING A SEAL BETWEEN CYLINDRICAL SURFACES

This invention relates to a device for establishing a seal between cylindrical surfaces having relative axial movements and of the type having a sealing ring mounted in a groove in one of the said surfaces and engaging the other surface, the said ring being made of parts of polymer material and metal overlapping each other, an elastically deformable material being arranged in said groove between the ring and an adjacent wall of the groove.

Sealing devices of the type referred to above are often used in applications in which it is desired to obtain a good sealing effect without use of lubricant. As examples of polymeric materials used the types sold under the registered trade marks "Teflon" or "Rulon" could be mentioned.

In case the sealing devices are used for sealing between spaces in which pressures having great difference prevail, it has been difficult to obtain an even wear and a low degree of wear offering an acceptable life time of the device.

This could be obtained by a device of the type referred to above which is characterized in that the ring part of polymer material and the ring part of metal are engaging each other along conically shaped surfaces, the ring part of metal being located at a small distance from the adjacent convex cylindrical surface and having greater length in the axial direction at this side than at the side located near the bottom of said groove.

The invention will be described in more detail reference being made to the drawing showing in axial section a device according to the invention.

The device shown is adapted to provide a seal between the convex, cylindrical surface 1 of a piston rod 2 and the concave, cylindrical surface 3 of a cylinder bottom 4. A sealing ring 6 of the polymeric material sold under the name "Rulon" and a support ring 7 of steel have been mounted in an annular groove 5 in said cylinder bottom 4. The ring 6 is adapted to engage the cylindrical surface 1 while a small gap exists between the steel ring 7 and said surface 1. A rubber ring 8 has been mounted in the groove 5 so that said groove 5 has been completely filled up at least along a part of its axial length.

The rings 6 and 7 are engaging each other along conically shaped surfaces having equal cone angles $\alpha$. The ring 7 has its greatest length in axial direction at the side adjacent to the surface 1.

The shown sealing device will operate as follows:

The cylinder bottom 4 divides a medium under high pressure in a chamber (not shown) located above the cylinder bottom 4 from a medium under substantially lower pressure in a chamber (not shown) located below the said cylinder bottom 4.

The medium will flow into the groove 5 from above and press the rubber ring 8 downwardly. The rubber ring 8 will have a complete sealing effect between the bottom of the groove 5 and the outside of the rings 6 and 7. The ring 6 is thus exposed to a great, inwardly directed force partly from the medium above the ring 8, partly from the side force established by the deformation of the ring 8. Due to the axial overlapping between the rings 6 and 7 the ring 7 will relieve the ring 6 from a part of the side force, thus causing a contact between the ring 6 and the cylindrical surface 1 offering an even distribution of pressure and thus an even wear of the ring 6.

What is claimed is:

1. A device for establishing a seal between cylindrical surfaces (1, 3) having relative axial movements and of the type having a sealing ring (6, 7) mounted in a groove (5) in one of the said surfaces (3) and engaging the other surface (1), the said ring (6, 7) being made of parts (6, 7) of polymer material and metal overlapping each other, an elastically deformable material (8) being arranged in said groove (5) between the ring (6, 7) and an adjacent wall of the groove (5), characterized in that the ring part (6) of polymer material and the ring part (7) of metal are engaging each other along conically shaped surfaces, the ring part (7) of metal being located at a small distance from the adjacent convex cylindrical surface (1) and having greater length in the axial direction at this side than at the side located near the bottom of said groove (5).

2. A cylindrical sealing ring assembly about a rod extending through a cylinder separating medium at high and low pressure on either side of the seal, comprising in combination, a groove in said cylinder for retaining said sealing ring assembly, two mating conically shaped rings partly filling said groove contacting at an intermediate sloping surface and having a gap for flow of medium into said groove and behind said rings at the high pressure side, and an elastic ring in said groove contacting the surface of each ring and the cylinder to seal the gap and to force the rings toward the rod with one in contact with the rod under pressure of said medium.

3. An assembly as defined in claim 2 wherein one of said two mating rings on the low pressure side is steel.

4. An assembly as defined in claim 3 wherein the other of said two mating rings on the high pressure side is of polymeric plastic.

5. An assembly as defined in claim 4 wherein said groove is offset having an outer greater width portion to receive said two mating rings therein and an inner narrower portion to receive said elastic ring.

* * * * *